Aug. 16, 1966        R. W. RUSH        3,266,116
SUPPORT FOR CERAMIC WARE
Filed Aug. 12, 1963
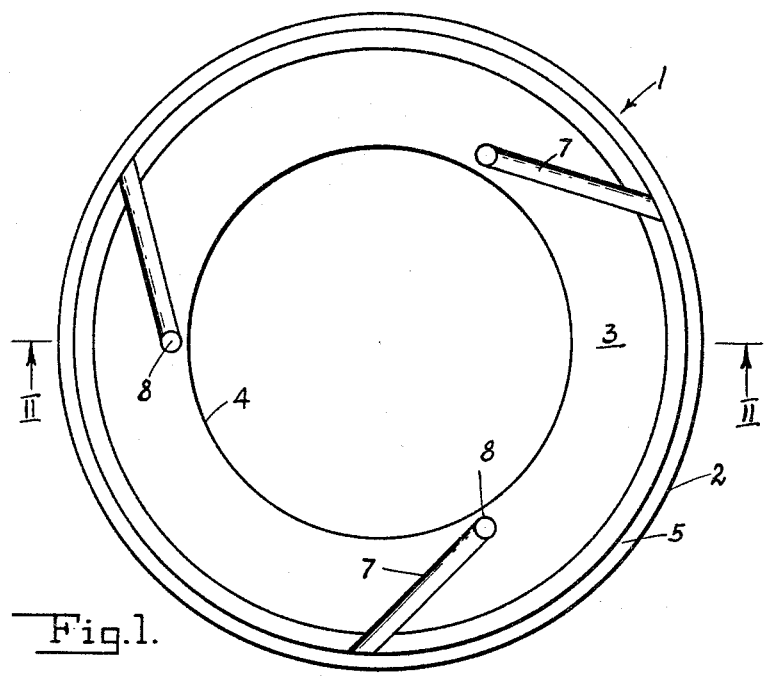
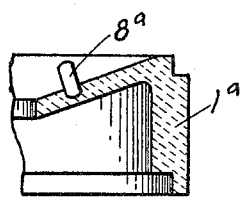
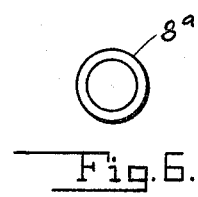
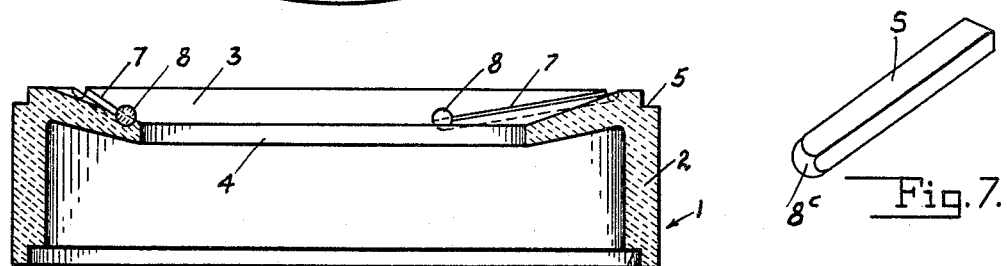
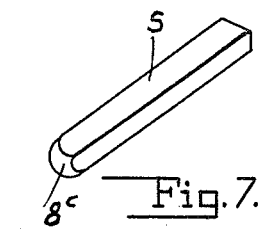
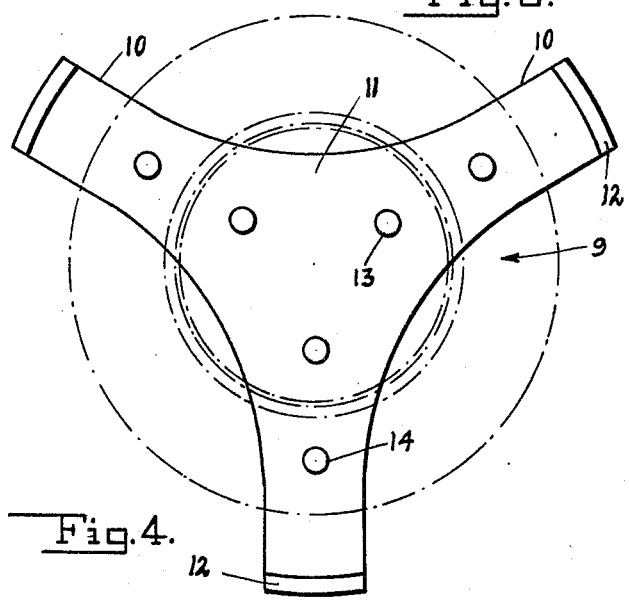
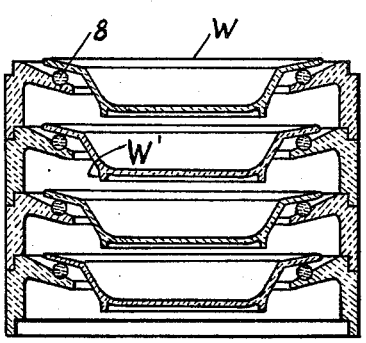
INVENTOR.
RAYMOND W. RUSH.
BY *Christy, Parmelee & Strickland*
ATTORNEYS.

United States Patent Office 3,266,116
Patented August 16, 1966

3,266,116
SUPPORT FOR CERAMIC WARE
Raymond W. Rush, Beaver, Pa., assignor to Mayer China Company, Beaver Falls, Pa., a corporation of Pennsylvania
Filed Aug. 12, 1963, Ser. No. 301,419
2 Claims. (Cl. 25—153)

The present invention relates generally to kiln firing of ceramic ware and, more specifically, to supports for the ware moving through a kiln during the firing operation.

One of the problems of firing the glaze upon the outer surface of the ware is the adherence between the glaze and the support with consequent pitting of the glazed surface at those points of contact between the ware and support. Such pits extend through the glazed surface and appear as dark spots during subsequent use of the ware. Depending upon the nature of the support, portions thereof may tend to adhere to the ware and to sever from the support and must be ground from the surface of the ware.

One object of the invention is to provide a ware support which minimizes pitting by absorption or repelling of the glaze whereby any adhering support portions may be removed without grinding.

Another object of the invention is to provide such a ware support embodied in conventional setters or spiders.

A further object of the invention is to provide such form of support which may be mechanically applied to a setter or spider.

These and other objects of the invention will be made apparent from the following description and the drawing forming a part thereof, wherein:

FIG. 1 shows a plan view of a setter equipped with a support of the invention;
FIG. 2 shows a section taken on line II—II of FIG. 1;
FIG. 3 shows a partial section through a stack of setters and the ware thereon;
FIG. 4 shows a conventional form of open spider provided with a support of the invention;
FIG. 5 shows a section through a setter equipped with a modified form of the ware support of the invention;
FIG. 6 shows a side elevation of the ware support of FIG. 5; and
FIG. 7 shows one form of the ware support of the invention adapted to a standard sagger pin.

Referring now to FIGS. 1 to 3 of the drawing, the setter ring, indicated generally as 1, may be of any suitable refractory material and is comprised of a peripheral ring portion 2 provided with an upper plate portion 3 which preferably slopes inwardly and downwardly from the upper edge of portion 2 so as to terminate in an annular opening 4. The opening 4 is of substantial size or of suitable dimension to receive the bottom portion of ware supported upon the plate portion 3 as hereinafter discussed.

Ring portion 2 at its outer peripheral edge is provided with suitable upper and lower annular recesses 5 and 6 respectively, to permit stacking of a plurality of rings, one upon the other as illustrated in FIG. 3. Extending inwardly of plate portion 3, from upper recess 5, are a plurality of recessed grooves 7 which may be as shown or in any other desired angular relation to the outer periphery of plate portion 3. These grooves 7 terminate inwardly of plate opening 4 and are provided with an arcuate bottom and inner end portion. The depth of grooves 7 will of necessity be such as to retain the ware support against displacement during use and, therefore, will vary with the size of support used.

The ball shaped ware support 8 may be of any suitable material such as refractory or metal. Presently preferred materials are mixtures of refractory clays and zirconium, silica or aluminum oxides which are heat hardened after formation. The refractory nature of oxides strengthens the clay, yet leaving the surface of the ball shaped support readily frangible and readily removed from the fired ware, by a conventional burnishing wheel or cork, felt, etc.

The ball shaped ware support of refractory material is preferably of relatively small diameter, thereby presenting a rather small contact with the ware. A ball of ¼ inch diameter has been found to provide excellent results. Larger sizes up to about ½ inch diameter can be used.

Preferably the grooves 7, in plate portion 3 of the setter, have an arcuate bottom surface conforming to the shape of the ware support received therein and of a width such as to permit free longitudinal movement of the support therein. The grooves 7 are shown in FIG. 1 as inclined relative to the periphery of the setter plate portion 3. When so disposed, the balls 8 therein do not tend to roll rearwardly of the groove as the ware expands during the firing operation.

As shown in FIG. 3 of the drawing the ware support balls 8 engage the under surface of the ware adjacent the outer periphery thereof. During firing with consequent expansion and contraction after cooling, the support 8 remains fixed relative to channel 7 so the relatively minute arcuate surface of support 8 in contact with the ware tends to fracture from the remainder of the ball surface without substantial damage to the adjacent glazed surface of the ware. Such fractured portion which may adhere to the ware, when removed from the setter, can be readily removed from the ware by means of a conventional burnishing wheel of cork, felt, etc.

Alternately the ware support balls 8 may be formed of suitable non-wetting materials other than the aforementioned oxides. Certain metallic materials including platinum and alloys thereof as well as stainless steel are refractory at the temperatures employed and the surfaces thereof being non-wetting do not readily fuse with the glaze during firing of the ware.

Referring now to FIG. 4 of the drawing wherein is shown an alternate form of conventional ware mounting, known as an open spider. As shown, the spider, indicated generally as 9, is comprised of three substantially equally spaced arms 10 joined at their inner ends by a closed central portion 11. At the outer ends of each arm 10 are suitable stacking means 12, which may be in the form of segments of the periphery ring portion 2 and recesses 5 and 6 of the setter of FIGS. 1 and 2. Within spider central portion 11 are equally spaced semi-spherical depressions 13 for reception of the ware support balls 8. These ware support balls 8 are positioned to engage and support the ware within the rim W' as indicated in FIG. 3. Additionally a semi-spherical depression 14 may be provided in each spider arm 10 for reception of a ware support ball 8. The relative positions of such ware supports 8 relative to the spider portions 10 and 13 and to the ware mounted thereon are indicated by the dot and dash lines defining a plan view of the ware W of FIG. 3.

A modified form of ware support 8 comprised of a disk is shown in FIGS. 5 and 6. Here the support 8a comprises a disc of suitable refractory material, as hereinbefore discussed, provided with arcuate peripheral edges and mounted upon the hereinbefore described setter or spider within a slotted opening of suitable dimensions. The disc may be solid or of ring form. The arcuate peripheral edge provides a similarly restricted contact with the ware, as does the spherical surface of the ball 8. Such a disc may be mounted in a setter 1a, shown in section on FIG. 5, or may be mounted on a spider of the general type shown in FIG. 4.

The spherical or ball shaped ware support 8, whether of the recited oxides and clay, or metals, or even other forms of metal having a plated coating of platinum, provides certain advantages in manual or automated placing thereof upon the setters and spiders aforesaid. It will be recognized that other geometrical forms of the ware support may be employed when provided with suitable arcuate or semi-spherical areas of contact with the ware. When using such other geometrical forms of ware support, it will be understood that the depressions in the setters, spiders or equivalents thereof, will be modified in shape to accommodate the specific geometrical form of support used. There are now available sufficiently sophisticated forms of apparatus for automated positioning the supports of various geometrical forms upon the said spiders and setters. Hence when the ware supports having arcuate or semi-spherical ware contacting surfaces are broadly referred to, any geometric form other than a ball is contemplated.

A further modification of the ball shaped ware support 8 is shown in FIG. 7 of the drawing. Here the spherical ware support 8c, of suitable refractory material, as hereinbefore discussed, may be suitably mounted upon one end of a conventional sagger pin S and both the pin and ball fired simultaneously.

Having thus described the invention in both preferred and possible modified forms, it will be understood that specific details of construction recited are by way of example and not limitation, except as made necessary by the scope of the appended claims.

I claim:

1. As an article of manufacture for mounting glazed ceramic ware upon suitable setters and spiders for movement through a firing kiln, a spherical porous body of readily frangible fired refractory material having an outside diameter less than three-quarters of an inch.

2. Apparatus for supporting glazed ceramic ware moving through a firing kiln, comprising:

(a) a suitable setter or spider for receiving the glazed ware,
(b) at least three suitable indentations upon an upper surface of said setter for reception of ware supports and retention thereof against lateral movement relative to the setter during heating and cooling of the ware during passage through the kiln, and
(c) a ware support in each said setter indentations of sufficient size to space the ware from the setter and having a porous spherical readily frangible ware engaging face providing a minimum of surface contact with the overlying glazed surface of the ware.

References Cited by the Examiner

UNITED STATES PATENTS

| | | | |
|---|---|---|---|
| 868,106 | 10/1907 | Mayer | 25—153 |
| 1,386,012 | 8/1921 | Meehan | 25—153 |
| 2,496,078 | 1/1950 | Wentworth | 25—153 X |
| 2,552,640 | 5/1951 | Morin | 25—153 X |
| 2,713,712 | 7/1955 | Orth et al. | 25—153 |
| 2,743,499 | 5/1956 | Edgerton | 25—153 |
| 2,842,447 | 7/1958 | Schlotzhauer et al. | 106—57 |
| 2,921,859 | 1/1960 | Godron | 106—57 X |

FOREIGN PATENTS 673,045  5/1952  Great Britain.

J. SPENCER OVERHOLSER, *Primary Examiner.*

ROBERT F. WHITE, MICHAEL V. BRINDISI,
*Examiners.*

G. A. KAP, *Assistant Examiner.*